United States Patent [19]

Moriyama et al.

[11] Patent Number: 4,752,205
[45] Date of Patent: Jun. 21, 1988

[54] EXTRUDED ELONGATE PASTA, AND DIE STRUCTURE AND EXTRUDER FOR FORMING THE SAME

[75] Inventors: Osamu Moriyama, Kawagoe; Akio Fujita, Tsurugashima; Hiroshi Saito, Utsunomiya, all of Japan

[73] Assignees: Nisshin Flour Milling Co., Ltd.; Ma. Ma-Macaroni Co., Ltd., both of Tokyo, Japan

[21] Appl. No.: 42,880

[22] Filed: Apr. 27, 1987

Related U.S. Application Data

[62] Division of Ser. No. 706,188, Feb. 27, 1985.

[30] Foreign Application Priority Data

Mar. 6, 1984 [JP] Japan .................. 59-32066
Mar. 14, 1984 [JP] Japan .................. 59-48442
Mar. 14, 1984 [JP] Japan .................. 59-48443

[51] Int. Cl.$^4$ .............. B29F 3/04; A21C 3/04
[52] U.S. Cl. .................. 425/465; 264/177.1; 426/451
[58] Field of Search ............ 264/177.1; 425/461, 425/464, 465

[56] References Cited

U.S. PATENT DOCUMENTS 1,956,564  5/1934  Crane et al. ............ 264/177.1 X
3,131,427  5/1964  Mika et al. .................. 425/464
3,518,019  6/1970  Nakamura .............. 264/177.1 X
4,248,581  2/1981  Harrison .................... 425/464
4,516,926  5/1985  Yip .............................. 425/464

FOREIGN PATENT DOCUMENTS 0175459 10/1983 Japan .
0621796  4/1949 United Kingdom .......... 264/177.1

Primary Examiner—Charles Hart
Attorney, Agent, or Firm—Larson and Taylor

[57] ABSTRACT

Extruded elongate pasta is disclosed, each pasta strand having at least one groove formed longitudinally in the pasta strand in such a manner that the total cross sectional area of the groove is 2 to 25% of the cross sectional area of the pasta strand, and the groove in the pasta strand is substantially closed after the elongate pasta is boiled or dipped in hot water. A die structure for extruding the elongate pasta is also disclosed, the die structure being so arranged that a projection is projected toward the axis of a die hole from the inner surface of the die hole and that the coefficient of friction of the inner surface of the die hole is 0.4 or less. It is preferable that a tapered portion is formed on the upstream end of the projection. Further, an extruder for forming the elongate pastas which has a number of such die holes is also disclosed, in which projections of the die holes are projected perpendicularly to the aligning direction of the die holes.

7 Claims, 7 Drawing Sheets

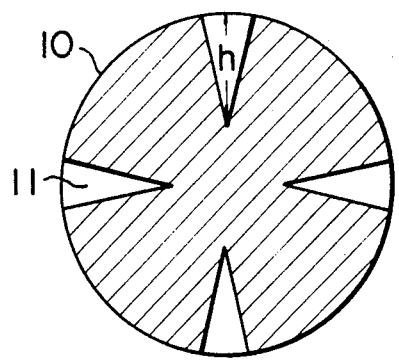
FIG. IA
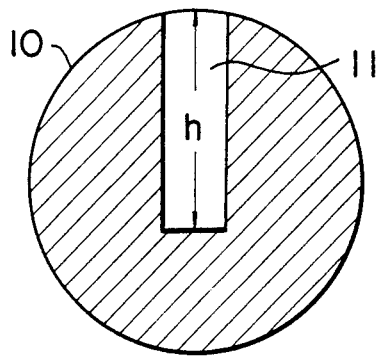
FIG. IB
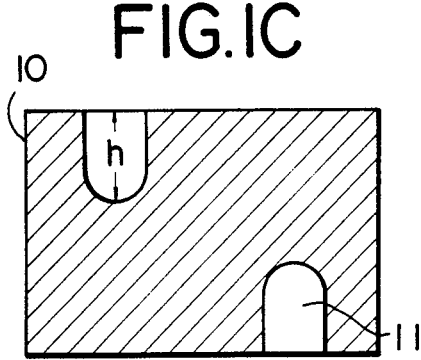
FIG. IC
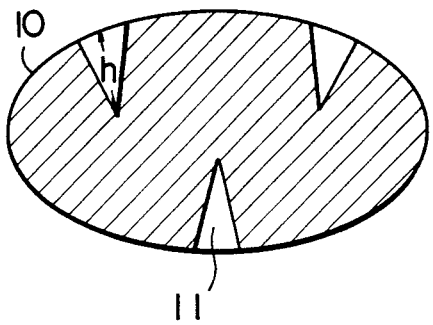
FIG. ID
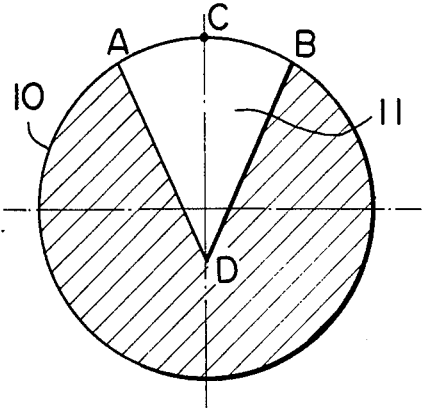
FIG. IE 4,752,205

EXTRUDED ELONGATE PASTA, AND DIE STRUCTURE AND EXTRUDER FOR FORMING THE SAME

This is a division of application Ser. No. 706,188 filed Feb. 27, 1985.

BACKGROUND OF THE INVENTION a. Technical field

This invention relates to an extruded elongate pasta (for example, spaghetti, noodle, Japanese noodle or so-called "Udon") noodle having one or more grooves in the surface of the pasta strand. The invention also relates to a die structure with at least one die hole adapted for extruding such elongate pasta and an extruder having a number of such die holes.

b. Description of the Prior art

Various kinds of elongate pastas are currently on the market, such as fresh elongate pastas, boiled elongate pastas, steamed elongate pastas, dry elongate pastas and instant elongate pastas. When eating the elongate pastas, it is necessary for a consumer to cook them for a long period of time. For example, it is necessary to boil spaghetti through hot water to prepare the spaghetti for eating, and it generally takes more than ten minutes to uniformly and sufficiently boil the spaghetti from the surface to the core. Generally, elongate pastas which can be cooked for eating as quickly as possible are favored by most people. To this end, various studies have been heretofore undertaken for the purpose of shortening the cooking time. For example, widening the surface of the elongate pasta or increasing the water penetration to the core of the elongate pasta. For instance, ideas such as (1) making the elongate pasta porous, (2) thinning the strand of the pasta, (3) forming a hole along the axis of the elongate pasta, and (4) adding starch to the raw material of the noodle have been tried. However, the elongate pastas prepared by these methods have drawbacks such as poor quality in texture and taste and generally require a lot of labor for production.

Japanese Patent Unexamined Publication No. 175459/83 proposes a cutout formed from the surface to the interior of elongate pasta. When the cross sectional area of the cutout is excessively small, the cooking time is not shortened, while when the cross sectional area of the cutout is excessively large, the cutout is not closed by boiling, and therefore the cooked elongate pasta has the disadvantage that shape of it is different from that of the ordinary elongate pasta. This leads to an undesirable texture.

SUMMARY OF THE INVENTION

Accordingly, it is a primary object of the invention to provide an extruded elongate pasta which can eliminate the above-described drawbacks and disadvantages.

To achieve the above and other objects, there is provided according to the invention an extruded elongate pasta which comprises at least one groove extending longitudinally in a pasta strand in such a manner that the total cross sectional area of the groove is 2 to 25% to the cross sectional area of the pasta strand and that the groove is substantially closed after the pasta is boiled or dipped in hot water. It is preferable that the depth of each of said groove is ⅓ to ⅔ of the thickness of the pasta strand.

It is another object of the invention to provide a die structure adapted for extruding the above-described elongate pasta.

To achieve this object, there is provided according to the invention a die structure which comprises a die hole or die holes, the die hole or each of the die holes having a projection, said projection being projected from part of the inner surface of the die hole toward the axis of the die hole.

Such a die structure is adapted for industrial production of extruded elongate pasta having one groove in a pasta strand, but according to further various tests by the inventors of the invention, there are further problems to be solved, and it is desired to eliminate these problems.

One of the problems to be solved is that a bend in the pasta strand is formed and/or that a burr is formed on the inner surface of the groove, when a pasta strand is extruded from a die hole with the projection.

As a result of analysis of the problem of the bend of the pasta strand, this bend was found to occur in such a manner that the groove is disposed inside of the bend. Accordingly, it is presumed that the bend may be formed because the large flow resistance at the projection of die hole causes the partial unbalance of the extruding speeds in the pasta strand.

It is surmised that the flow resistance in the die hole is, firstly, dependent on the special shape of the inner surface of the die hole and, secondly, dependent on the friction on the inner surface. It can be generally surmised that the influence of the special shape of the inner surface on the flow resistance is large in the die hole having the above-described projection.

As a result of various trials of different die holes by the inventors, it was surmised that, when the coefficient of friction of the inner surface (inner peripheral surface and the surface of the projection) of the die hole having the above-described projection is set to a predetermined degree or lower, the problem of the bent in the pasta strand extruded from the die hole can be eliminated without particular changes in the shape of the projection (the elimination of the problem of the bend means no reduction in the commercial value caused by the bend, no substantial disturbance in an entanglement of adjacent pasta strands, and no rough surface with burr of pasta strand).

Accordingly, it is yet another object of the invention to provide a die structure in which the coefficient of friction on the inner surface of the die hole is lower than a predetermined limit.

To achieve this object, there is provided according to the invention a die structure wherein the coefficient of friction of the inner surface of the die hole is 0.4 or less. In this die structure, it is preferable that the die hole is formed by piercing a solid body of a hard fluorine resin fastened into a large diameter through-hole in a metal die holder, the piercing being preferably carried out by a laser processing.

It is also preferable that the die hole is formed by piercing a metal die holder itself, and the inner surface of the die hole is preferably fine-finished.

A second problem to be solved, is that when the projection directly projected from the inner surface of the die hole toward the axis of the die hole is axially extended in the die hole, the inside surface of the groove of the pasta strand tends to become rough, and the rough surface causes increased cooking loss in hot water when the elongate pasta is boiled.

The extent of this problem varies according to the raw materials, the mixing conditions of dough, extruding conditions and so on, but must be considered in order to obtain a product of high quality, and to obtain satisfactory productivity when making the product.

Accordingly, it is still another object of the invention to provide a die structure which can prevent the inside surface of the groove formed as described above from becoming rough when a pasta strand is extruded from a die hole having a projection described above.

To achieve the object, there is provided according to the present invention a die structure wherein a C-shaped piece having an inner surface of low coefficient of friction is mounted in a through-hole in a metal die holder having a projection projected from part of the inner surface of the through-hole toward the axis of the through-hole in such a manner that both ends of the cutout of the C-shaped piece are snugly engaged with both side surfaces of the root of the projection to define the die hole by the C-shaped piece and the projection.

As a result of tests of extruding a pasta strand through the die hole having the above-described projection by the inventors, it is surmised that the roughness of the surfaces in the groove is derived from the strong action of the resistance against the dough when the dough passes through the die hole while influenced by the shape of the projection. In general, the inner surface of the die hole is polished to be smooth surface having low friction and, when the smoothness is insufficient, so-called skin roughness occurs on the surface of the pasta strand extruded through the die. However, according to the test of extruding the elongate pasta through the die hole having the abovementioned projection, the inner surfaces of the groove of the obtained pasta strand frequently exhibits burred state which has roughness in exces of the skin roughness described above, and it is concluded that the burred state is not only based on the difficulty of the surface smoothness of the projection, but also based on the special shape of the projection.

Accordingly, it is still another object of the invention to provide a die structure wherein the surface roughness of the extruded pasta strand can be prevented by specifying the shape of the projection formed in the die hole.

To achieve the object, there is provided according to the invention a die structure in which the projection is provided in its upstream section in the dough flow direction with a tapered portion which is so formed that its cross sectional area decreases gradually toward the upstream end.

A third point to be solved relates to a practical extruder for simultaneously extruding a number of pasta strands each having groove from a number of die holes.

When the problem of the abovementioned bend of the pasta strand is considered in the context of a series of facilities for practically producing pasta strands, it is desired to device a production method that is not impeded by a slight bend of the pasta strand. This accounts for the case in which the bend occurs as a result of the mixing ratio of the raw materials, the extruding speed and so on, except when the bend is negligible. Further, since the pasta strands are extruded from a practical extruder having a number of die holes positioned close to one another to improve productivity and reduce the size of the production facility, it is necessary to prevent entanglement of the pasta strands due to the bend of the strands.

Accordingly, it is still another object of the present invention to provide an extruder having a number of die holes formed with projections for forming grooves in the respective extruded pasta strands, said die holes being arranged in close to one another in an extruding port, said extruder having a feature such that interference due to the bend of the pasta strands extruded from the die holes is reliably prevented.

To achieve the object, there is provided according to the invention an extruder for extruding noodles having a number of die holes each of the die holes being formed with projections projected from part of the inner surface of the die hole toward the axis of the die hole, said die holes being aligned rectilinearly or circumferentially with and densely packed in an extruding port, wherein the projections in the die holes are projected perpendicular to the aligning direction of the die holes.

According to one embodiment of such an extruder of the invention, the extruding port is rectangular, and the die holes are aligned in one or more rectilinear lines along one side of the extruding port.

According to another embodiment of such an extruder of the invention, the extruding port is circular, and the die holes are aligned in one circle or a plurality of concentric circle in the extruding port, and the projections are projected radially outwardly in relation to the center of the circle.

BRIEF DESCRIPTION OF THE DRAWINGS

The above and other objects, features and advantages of the present invention will become more readily apparent from the following description, reference being made to the accompanying drawings in which:

FIG. 1A, FIG. 1B, FIG. 1C, FIG. 1D and FIG. 1E are respectively cross-sectional views of fresh pasta strands of various types according to the invention;

DETAILED DESCRIPTION OF THE PREFERRED EMBODIMENTS

Figure 2:
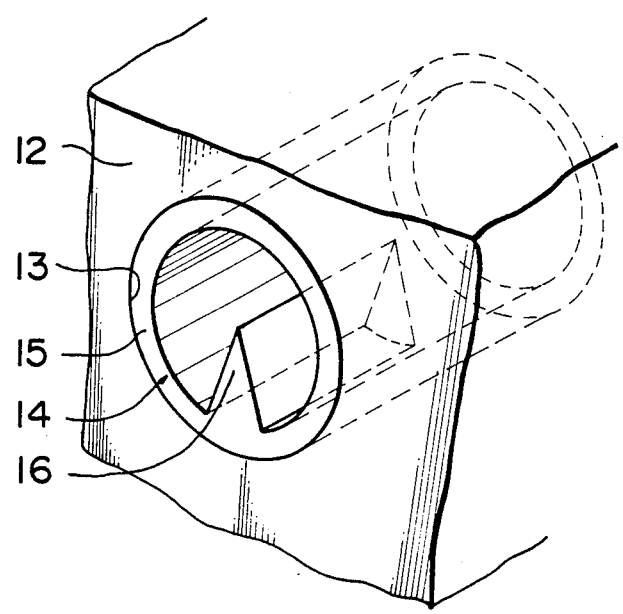
FIG. 2 is a perspective view of one embodiment of a die structure according to the invention.

As shown in FIGS. 1A to 1E, which show cross-sectional views of the fresh pasta strand of various embodiments of extruded elongate pasta according to the present invention, the cross-sectional of the fresh pasta strand has various shapes such as a circular, a rectangular, or an elliptical shape, and these shapes are not limited to the particular shapes. A pasta strand 10 has at least a groove 11 extending longitudinally in the pasta strand 10.

The cross section of the groove 11 may have any of V-, U- and polygonal shapes, and the V-shape is particularly preferable. The number of grooves 11 is preferably one to four. The grooves 11 are preferably so positioned that one of the radial lines of the cross section of the pasta strand coincides with the center line of the cross section of the groove in case that the cross section of the pasta strand 10 is circular as shown in FIGS. 1A, 1B and 1E, but the positions of the grooves are not particularly limited in case the cross section of the pasta strand 10 has other shapes (such as polygonal, or elliptical shape) as shown in FIGS. 1C and 1D.

The total area of the cross section of the groove(s) 11 is 2 to 25% and more preferably 10 to 20% with respect to the area of the cross section of the pasta strand 10. If said total area of the groove(s) 11 is smaller than the above-described range, the effect of shortening the cooking time such as the boiling time cannot be obtained, while if it is larger than the above-described range, the groove of the noodle cannot be closed after cooking such as boiling, with the result that the pasta strand after boiling has a different shape from the ordinary pasta strand, and thereby has an undesirable texture.

The width of the opening of the groove 11 of the pasta strand is represented by the width of the opening at the outer periphery of the noodle strand 10. When the cross section of the pasta strand is circular, said width is designated by the length of the arc ACB connecting the both ends A and B of the opening shown in FIG. 1E. Such a width is preferably ¼ or less with respect to the circumference of the cross section of the pasta strand 10. If it is larger than this length, the groove 11 is not cleared after cooking.

The depth of the groove 11 is designated by the length of the line from the center of the opening in the outer periphery to the deepest portion of the groove in the pasta. For example, in FIGS. 1A to 1D, the depth of the groove 11 is designated by reference character h, and in FIG. 1E, the depth is designated by the length of the line CD. It is preferable that the depth of the groove 11 is ⅓ to ⅔ of the thickness of the pasta strand 10. If the depth of the groove 11 is smaller than ⅓, the effect of shortening the cooking time is eliminated, while if it is larger than ⅔, the pasta strand 10 tends to be cracked, which is undesirable.

The shape, number, position, width and depth of the above-described grooves 11 are suitably selected according to the shape, thickness and so on of the pasta strand, so as not be deteriorate the quality in texture and taste.

The method of forming the groove or grooves 11 is not limited to the particular one, but for example, the noodle strand with the groove or grooves can be formed by means of the die structure of an extruder.

The elongate pasta thus shaped as described above can be processed into the fresh, steamed, dry or instant elongate pastas. Further, to shorten the cooking time, starch such as potato starch, or tapioca starch may be added to the raw material of the noodle.

One important advantage obtained by the elongate pasta according to the invention is that the cooking time is reduced to approx. half the cooking time of conventional, elongate pasta of the same quality having no groove. Further, before cooking, the elongate pasta has one or more grooves, but when the elongate pasta is boiled or dipped in hot water to be converted to an edible state, the groove of the elongate pasta is closed by water absorption and swelling of the pasta. This elongate pasta has the same texture as ordinary elongate pasta. When this elongate pasta is eaten after dipping it in a pasta soup, the soup is sufficiently applied to the pasta due to the presence of the groove, and therefore the elongate pasta has an acceptable texture. The instant elongate pasta prepared from the extruded elongate pasta according to the invention has the advantage that the cooking time of the pasta is short, and therefore cooking loss of the surface from the pasta is greatly eliminated.

A die structure adapted for extruding elongate pasta having one V-shaped groove (i.e. groove with V-shaped cross section) according to the invention will now be described in detail. FIG. 2 shows a hole portion of an embodiment of the die structure according to the invention. A die holder 12 associated fixedly with the front surface of a barrel of an extruder (not shown) is formed of a metal material such as a gun metal, and a large-diameter through-hole 13 passing through the die holder 12 in the direction of greatest thickness in the holder 12. This through-hole is arranged to communicate between the interior and the exterior of the extruder. A sleeve member 14 is engaged fixedly with the inside of the through-hole 13. The member 14 is formed, for example, of a hard fluorine resin, and composed of a peripheral sleeve section 15 and a wedge-shaped projection 16 (i.e. projection with wedge-shaped cross section) projected from part of the inner surface of the hole in the member 14 toward the axis of this hole, said hole constituting a die hole in the die structure. The size of the inner diameter of the sleeve section 15 and the size and shape of the projection 16 should be so determined as to coincide with the diameter of the pasta strand to be formed, and the size and shape of the groove with the V-shaped cross section. For example, when the elongate pasta is spaghetti, it is frequently preferable that the inner diameter of the sleeve section 15 (diameter d of the die hole) is generally 1.5 to 2.5 mm, the width of the root of the projection 16 is 0.15 d to 0.5 d, the height of the projection is similarly ½ d to ⅔ d, and the axial length of the projection extending from the outer end face of the extruder is ¼ L to ¾ L, where L is the axial length of the sleeve section.

When the coefficient of friction of the inner surface of the die hole (with projection) formed in the sleeve member is 0.4 or less, and more preferably 0.2 to 0.04, it is experimentally confirmed that the bend of the extruded pasta strand and the roughness of the surface of the pasta strand are not substantial when the V-shaped groove made by the projection remains as shown in FIG. 1E.

Figure 3:
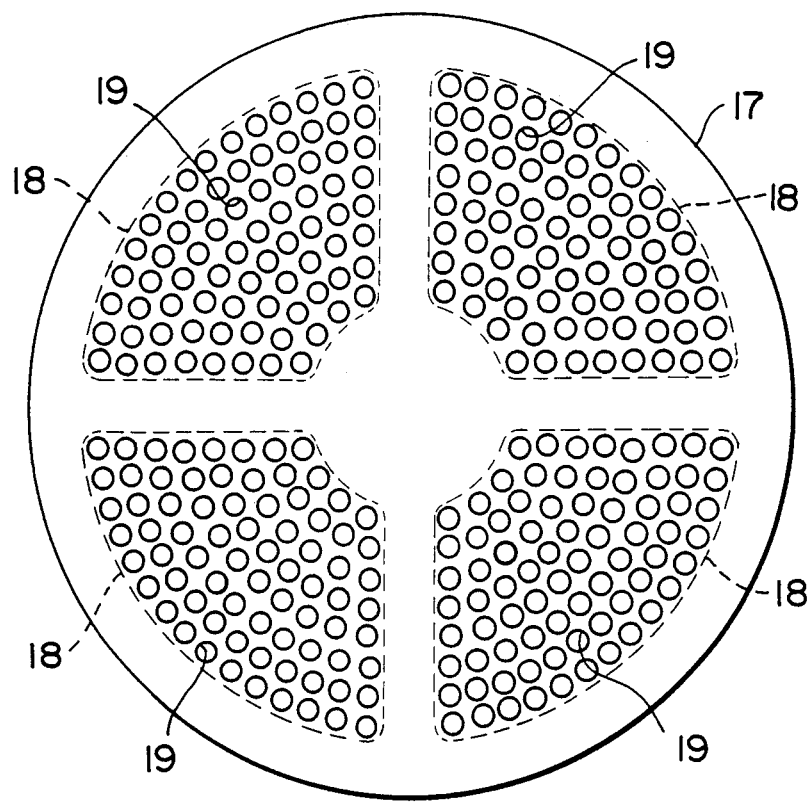
FIG. 3 is a front view of a die holder in the embodiment of FIG. 2.
Figure 4:
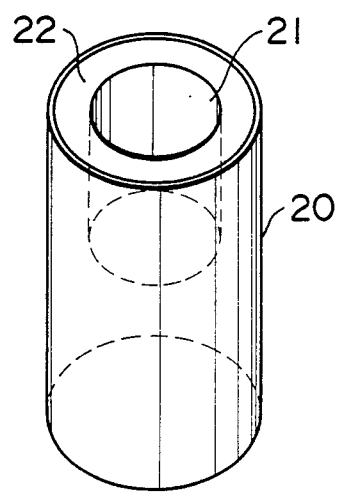
FIG. 4 is a perspective view of a columnar member in the embodiment of FIG. 2.

FIGS. 3 to 5 show such a die structure applied to a practical extruder. FIG. 3 shows a die holder 17 in the die structure. The holder 17 has four regions 18 in the four quadrants, each of which regions contain large-diameter through-holes 19 formed in a densely packed arrangement in multiple concentric circles and these holes 19 pass through in the direction of greatest thickness.

In this embodiment, columnar members 20 of hard fluorine resin shown in FIG. 4 are respectively press-fitted into the through-holes 19. Each member 20 is formed side with a short, small-diameter blind hole 21 at one side, and in the opening edge with a countersinking guide face 22. The blind hole 21 and the guide face 22 are for smoothing the flow of the dough in the extruding operation. The member 20 is press-fitted into the through-hole 19 in such a manner that the opening side of the hole 21 is disposed inside the extruder. After the member 20 is press-fitted into the through-hole 19, the die hole having the projection 16 as shown in FIG. 2 is formed, for example, by a laser machining method.

Figure 5A:
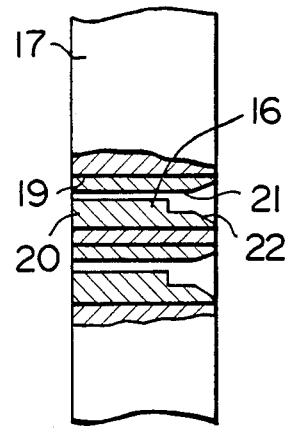
FIGS. 5A and 5B are partial sectional view and a front view of the die holder equipped with the columnar members in the embodiment of FIG. 2.
Figure 5B:
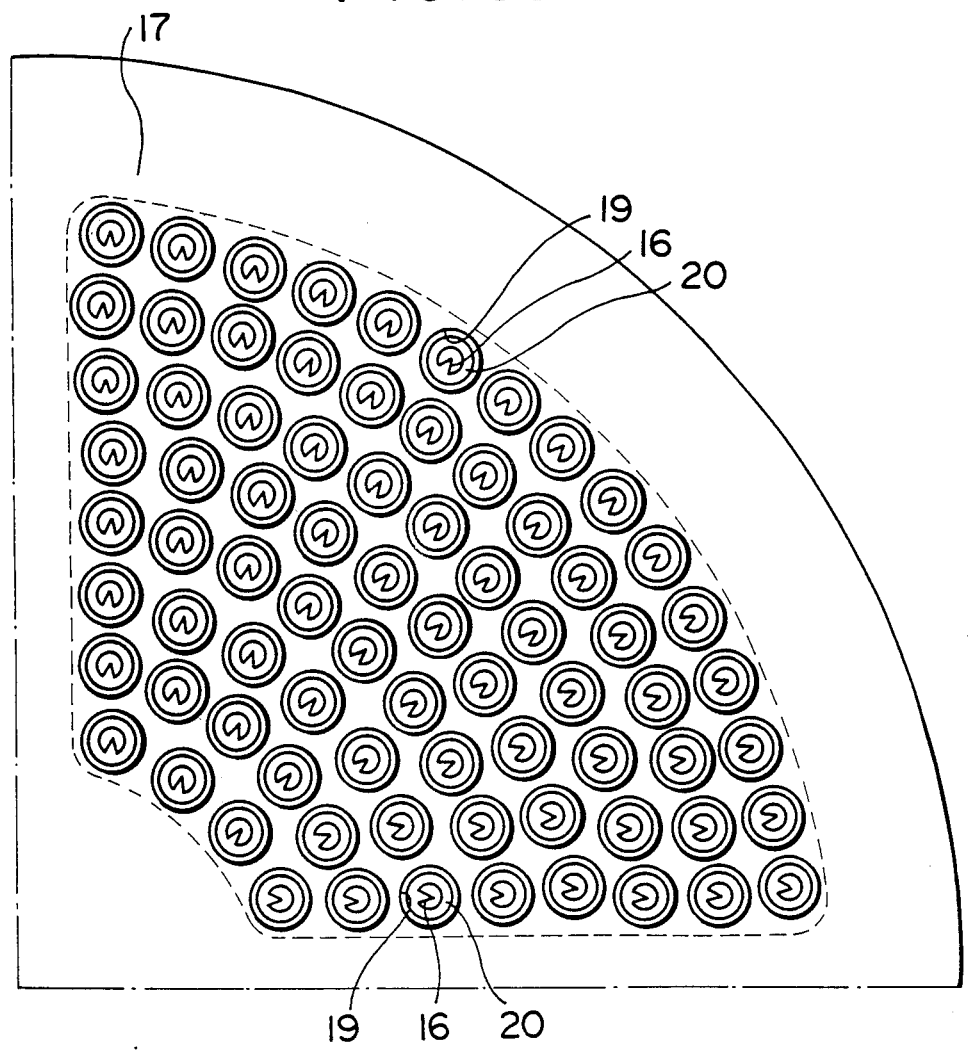

FIGS. 5A and 5B show part of a die structure formed with the die hole as described above.

According to this embodiment shown in FIGS. 3 to 5, it has the advantage that the machining tool can be sequentially located over a number of columnar members held by the die holder and such an operation is rapid as compared with the case that the columnar members are machined one by one. Additionally it has the advantage that a distortion or deformation of the die hole due to press-fitting is not necessarily a problem as compared with the case that the piece formed in advance with the die hole is press-fitted into the through-hole, and therefore the quality of the elongate pasta can be improved due to the accurate production of the elongate pasta having a constant diameter. This is important for dry elongate pasta of this type in which a difference in the diameter of 0.1 mm normally influences the amount of boiling required to cook the pasta.

The die structure according to the invention can be constructed by piercing the die hole directly in the die holder itself, separately from the above-described embodiment shown in FIGS. 2 to 5. In this case, since the die holder is ordinarily formed of metal, the die holder may be pierced by an electric discharge machining method. Since the inner surface of the die hole having lower coefficient of friction than 0.4 cannot be obtained by the electric discharge machining method, it is necessary to fine-finish the inner surface of the die hole. More particularly, the fine-finishing may be electrolytic polishing, vacuum titanium coating or buffing.

According to the embodiment shown in FIGS. 2 to 5 and the modification in which the inner surface of the die hole is fine-finished, the coefficient of friction of the inner surface of the die hole is selected to be 0.4 or less. Therefore, the bend of the pasta strand and the roughness of the surface of the elongate pasta will not be produced when the pasta strand is extruded through the die hole with the simple wedge-shaped projection.

Figure 6:
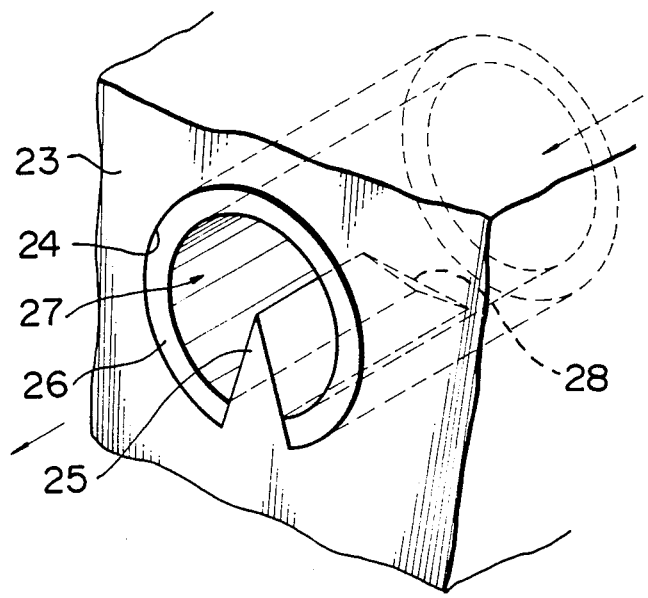
FIG. 6 is a perspective view of another embodiment of the die structure according to the invention.

FIG. 6 shows schematically another embodiment of a die structure used for forming elongate pasta e.g. spaghetti according to the invention. In FIG. 6, numeral 23 designates a die holder made of a gun metal, which is associated fixedly with the front surface of the barrel of an extruder (not shown). The thickness of the holder 23 is substantially equal to that used for a general spaghetti extruder.

A large-diameter through-hole 24 is formed through the direction of greatest thickness of the holder. The through-hole 24 has a projection 25 projected in a wedge shape (i.e. so as to have wedge-shaped cross section) from part of the inner surface of this through-hole toward the axis of this through-hole, and a sleeve-like C-shaped piece (e.g., molded of hard fluorine resin) 26 having an inner surface of low coefficient of friction is internally mounted in the through-hole 24 so that the both ends of the C-shaped piece are engaged closely with both sides of the root of the projection 25. Thus, die hole 27 of hollow passage shape which is defined by the inner surface of the C-shaped piece 26 and the end surfaces of the projection 25 is provided. When the dough is pressed into the die hole 27 thus shaped in a direction shown by an arrow with a broken line in FIG. 6 and extruded in a direction shown by an arrow with a solid line, a pasta strand having the sectional shape coincident to that of the hollow passage defined by the inner surface of the die hole 27 is formed, and therefore this pasta strand is formed with a groove with V-shaped cross section extending longitudinally, said groove being formed by the projection 25.

The diameter d of the hole 27 in the case of forming spaghetti is normally approx. 1.5 to 2.5 mm. The width of the root of the projection 25 provided in the die hole 27 is 0.15 d to 0.5 d and preferably 0.3 d to 0.4 d, and the height of the projection 25 is ⅓ d to 5/6 d and preferably ½ d to ⅔ d. These sizes are preferable to shorten the cooking time of the product and to obtain a desirable state of cooking of the noodle.

When the wedge-shaped projection 25 is formed having the same cross-sectional shape the axial length of the die hole 27, there is a risk of a rough surface with burr being formed on the extruded noodle strand as described above. This is considered because, when the projection 25 has a perpendicular end face which disturb the extrusion of the dough, the dough collides with the end face to form a stagnation region of the dough and shearing breaking action occurs between the stagnating dough and the flowing dough at the edge of the end face. The influence of the stagnation region can be eliminated by sufficiently increasing the axial lengths of the die hole 27 and the wedge-shaped projection 25 to some degree, but the length of the die hole is limited in practice, and therefore the increase in the axial length of the hole 27 and the projection 25 is practically impossible.

Accordingly, in this embodiment, a tapered surface 28 which gradually decreases in cross-sectional area toward the upstream side employed in the dough flow direction is employed. Thereby the dough stagnation region is eliminated and the dough flows smoothly.

In this case, the necessary axial length of the tapered section formed with the tapered surface 28 of the projection 25 is dictated by, the ratio of the axial length of the tapered section to the entire axial length of the projection 25 in FIG. 6. This ratio is 20% or higher and more preferably 30% or higher. The tapered section may extend from the upstream end to the wedge-shaped downstream end of the projection to form a entirely tapered wedge-shaped projection.

FIGS. 7 to 10 show an embodiment of the structure in which the die hole 27 having the projection 25 formed with the tapered surface 28 is applied to a concrete extruder. In this structure, a number of die holes are aligned in the multiple concentric circles in a disc-shaped die holder.

Figure 7:
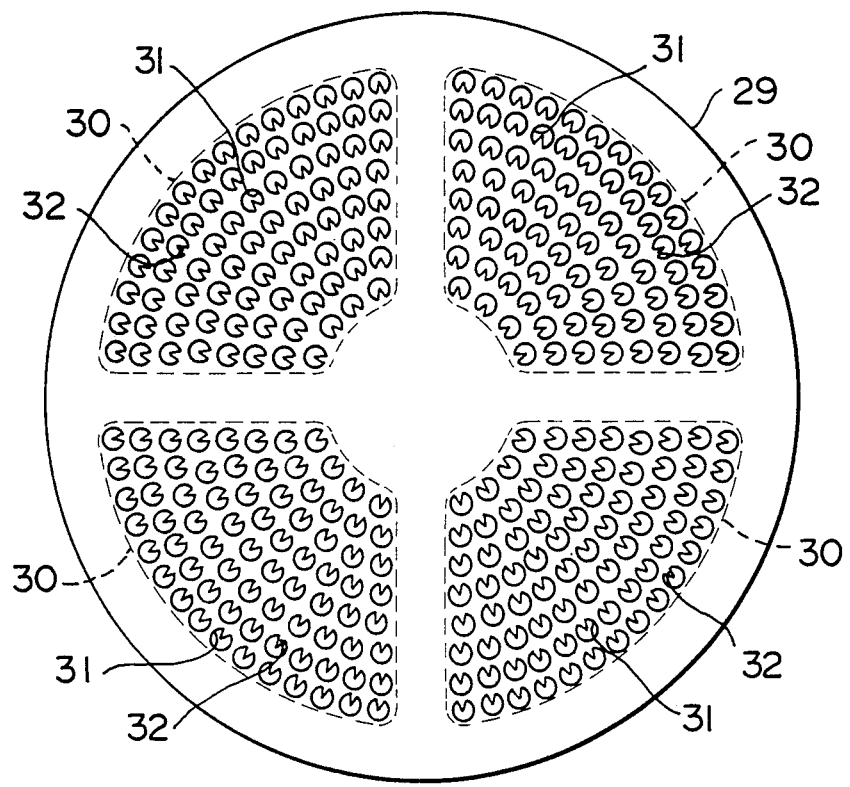
FIG. 7 is a bottom view of a practical extruder to which the die structure of the embodiment in FIG. 6 is applied.

FIG. 7 shows a die structure constituted by a die holder 29 of disc shape made of gun metal mounted fixedly on the front surface of the barrel of an extruder in this embodiment. A number of large-diameter through-holes 31 formed with projections 32 are aligned in eight concentric circles in the die hole forming region 30 in four quadrants.

Figure 8A:
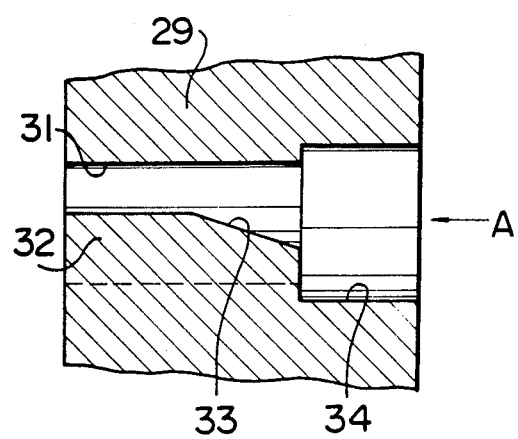
FIGS. 8A and 8B are a partial sectional view of a die holder in the embodiment of FIG. 6 and a view seen from the direction of an arrow A of FIG. 8A.
Figure 8B:
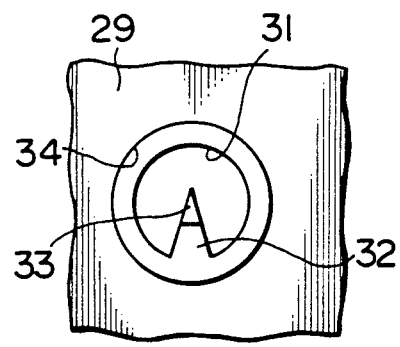

FIGS. 8A and 8B show enlarged views of one of the large-diameter through-holes 31 in the die holder 29, wherein FIG. 8A is a sectional view through the axis of the through-hole, and FIG. 8B is a view showing the large diameter through-hole 31 seen from the inside of the extruder. Numeral 33 designates a tapered surface formed at the inner end of the projection 32, and numeral 34 designates a stepped large-diameter section for positioning a piece 35 for forming a die hole to be described in the following.

Figure 9A:
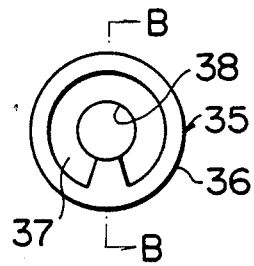
FIGS. 9A and 9B are a front view of a die hole forming piece in the embodiment of FIG. 6 and a sectional view taken along the line B—B of FIG. 9A.
Figure 9B:
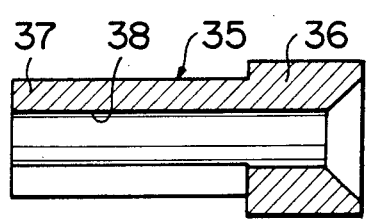

FIGS. 9A and 9B show the piece 35 for forming the die hole, said piece being mounted by press-fitting it into the through-hole 31 in the holder 29. In this embodiment, the piece 35 is composed of a C-shaped ring portion 37 engaged within the through-hole 31 and an annular portion 36 to be engaged with the stepped large-diameter section 34, said portion 37 being integrated with the end side of the portion 36. Both ends of the circumferential cutout of the portion 37 are so formed in the shape and size that these are closely contacted with the side of the root of the projection 32, and the inner surface 38 of this portion is formed as the inner surface of the die hole. The piece 35 is made, for example, of synthetic resin such as hard fluorine resin due to the smoothness of the inner surface and the easiness of machining, but the piece 35 with an inner lining of such resin may be used.

Figure 10A:
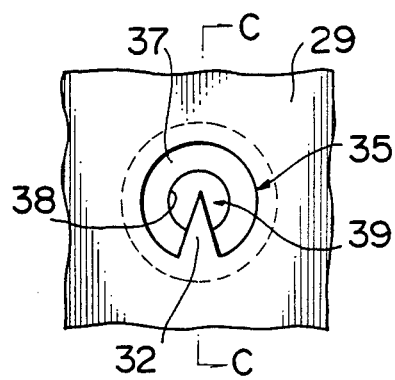
FIGS. 10A and 10B are a front view of the die holder with the die hole forming piece in the embodiment of FIG. 6 and a sectional view taken along the line C—C of FIG. 10A.
Figure 10B:
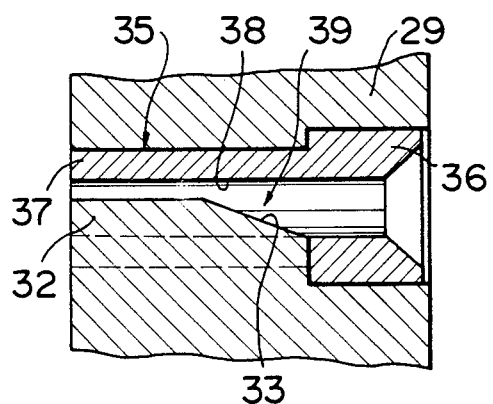

FIGS. 10A and 10B show the piece 35 shown in FIGS. 9A and 9B, said piece 35 being press-fitted into through-hole 31 in the holder 29 shown in FIGS. 8A and 8B. It is understood that the die hole 39 in this embodiment is defined by the inner surface of the piece 35, and the side surfaces of the tip end portion of the projection 32 projecting from the die holder 29. The tapered surface 33 which gradually decrease in cross sectional area is formed on the rear end of the projection 32, and the die hole having the shape shown in FIG. 6 can be prepared by a relatively easy machining process.

When spaghetti was extruded by the die structure constructed as described above in which the diameter d of the die hole is 2.5 mm, the width of the root of the wedge-shaped projection 32 in the die hole is about 1.0 mm (2/5 d), the height of the projection 32 is approx. 1.6 mm (⅔ d), the axial length of the section with constant sectional area of the wedge-shaped projection extending inwardly from the extruding opening edge of the die hole is approx. 3 mm, and the axial length of the tapered surface 33 is approx. 7 mm, a spaghetti having the V-shaped groove was obtained, and the inner surfaces of the V-shaped groove continued longitudinally as smooth surfaces.

Figure 11:
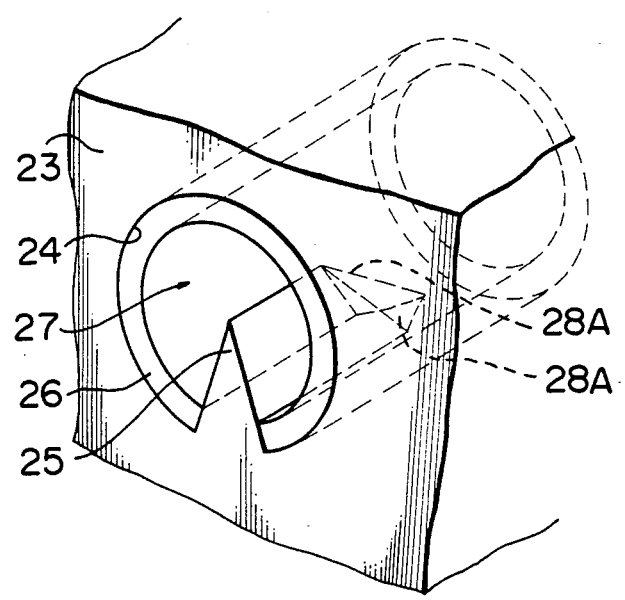
FIG. 11 is a perspective view of a modification of the embodiment of FIG. 6.

As a modification of the embodiment shown in FIGS. 6 to 10, the end of the projection 25 in the die hole 27 at the upstream side of dough flow may be formed with a crest-shaped tapered surface 28A as shown, for example, in FIG. 11. In this case, the same effect and advantages as those described above can be provided from the fact that the dough is guided to be divided around both sides of the projection 25 and therefore no stagnation of dough occurs. The product of this embodiment is not limited to spaghetti, this embodiment can be applied to the extruder for extrusion of the same type entirely in the similar manner as described above.

The embodiment shown in FIGS. 6 to 11 according to the invention provides the effect and advantage adapted for solving a problem of preventing the roughness of the inside of the groove which is among various problems encountered in the properties of elongate pasta when the elongate pasta with the longitudinally extending V-shaped groove is extruded. Further, according to this embodiment, the projection is formed of metal unlike the C-shaped piece, and therefore has excellent durability. Moreover, when the C-shaped piece is worn the die structure can be renewed by replacing the worn C-shaped piece, thereby providing useful effect.

According to FIG. 7, the wedge-shaped projections 32 projected from the inner surfaces of the die holes 31 toward the axis of the die hole are formed, and yet the projections 32 are so disposed that these are projected outwards in the radial direction from the center axis of the die holder 29 in such a manner that the projecting direction of the projections are all perpendicular to the aligning direction or the circumferential direction.

The extruder having the die structure thus described as above is so arranged that the extruding direction of the pasta strand is downward in the same manner as the usual extruder, and the pasta strand is, while being extruded, cut at predetermined lengths by the operation of a shearing mechanism disposed below the extruder.

The size of the die hole is, in case of spaghetti, generally approx. 1.5 mm to 2.5 mm in diameter. The die holes are positioned in a densely packed array as close as possible in order to achieve improvements in productivity and the reduction in the size of the extruder, and it is preferable that the interval between the die holes is generally approx. 3 mm to 20 mm.

In the die structure described above, the bend of the extruded pasta strand can be sufficiently eliminated by the shape of the projection shown in FIG. 6 or 11. However, when the tapered surface of the projection constructed as shown is not formed, or even if the tapered surface is formed, it cannot eliminate entirely the occurrence of the bend of the pasta strand from the initial to the final end of the extruding work, caused by the influence of the mixture of the raw materials, extruding speed, and coefficient of friction of the inner surface of the die hole. In this case, assume that the projecting directions of the projections 32 are arbitrarily given in the respective die holes, being different from FIG. 7. Then, the pasta strands extruded through the die holes are contacted with each other in the course of dropping, and are crossed with each other in an extreme case, and might be entangled with each other.

However, when the projecting directions of the projections 32 of the die holes are aligned in a predetermined direction as shown in FIG. 7 (in a direction that each of them projects outwards in the radial direction from the axis of the die holder), the directions of the bendings of the extruded pasta strands due to the projections are aligned in a predetermined direction (inwards in the radial direction), and the inconvenience described above becomes negligible.

Further, in this embodiment, since all of the projections 32 are so arranged that each of them projects outwards from the axis of the die holder in the radial direction, though extruded pasta strands are bent, these are so bent as to concentrate toward the axis of the die holder, and therefore the displacement of the die structure in relation to the shearing mechanism disposed below it need not be considered at all. This is a further advantage of this embodiment.

As a modification of an array of die holes aligned in the circumferences as shown in FIG. 7, the fundamental idea of this embodiment can be also applied to the case that a number of die holes are aligned in a densely packed array along the long side of a elongated die holder. Even in this case, since similar to the previous embodiment, the bend of the extruded pasta strand occurs in the opposite direction to the projecting directions of the projections, if the projecting directions of the projections are set perpendicularly to the aligning direction of the die holes (that is the direction parallel to the long side), then the same effect and advantage as those of the embodiment described above are provided. In this case, when the die holes aligned in the long side direction of the elongated die holder is even in the number, all of the projections in the die holes may be projected in the same direction, or die holes may be divided at the center line of lateral direction to two groups and the projections of both groups may be directed oppositely.

According to the die holes arranged as shown in FIG. 7 or in the modification of the embodiment of FIG. 7, the extruder is adapted sufficiently to the requirements of the structure in which a number of die holes are aligned in a close interval, such that the difficulties occurring in such an extruder can be reliably eliminated, thereby providing excellent improvement in the practical extruder.

Examples of extruded elongate pastas according to the invention will be described to more concretely explain the invention, but the invention is not limited to the particular Examples.

EXAMPLE 1

100 parts of durum semolina and 30 parts of water were mixed, and the mixture was supplied to an extruder. A die structure mounted in the extruder has a wedge-shaped projection formed longitudinally in a circular die hole having 2.5 mm of inner diameter. Spaghetti made by this die structure had the same shape as that shown in FIG. 1E. The cross sectional area of the V-shaped groove was 20% of that of the pasta strand without the groove, and the depth of the groove (corresponding to CD in FIG. 1E) was 1.6 mm. The length of the opening in the groove in the cross-section of the elongate pasta (corresponding to the circular arc ACB in FIG. 1E) was 15.8% of the circumference of the pasta. The fresh spaghetti made by this extruder was dried to obtain dry spaghetti.

On the other hand, the same mixture as that described above was supplied to the extruder equipped with a die structure having an ordinary circular die hole (having 2.0 mm of diameter) for reference to the above, to form fresh spaghetti, and the fresh spaghetti was then dried to obtain dry spaghetti.

When the dry spaghetti of the above both types were boiled, the spaghetti of the invention became cooked in 7 minutes, but the reference spaghetti required 12 minutes until being cooked. The appearance and texture of the spaghetti of the invention was not different from those of the reference spaghetti, and the presence of the groove could not be felt in case of eating them. Both spaghettis had the same diameter after boiling.

EXAMPLE 2

40 parts of durum semolina, 40 parts of hard wheat flour, 20 parts of potato starch and 33 parts of water were mixed, and the mixture was supplied to an extruder. The die structure mounted in the extruder has four wedge-shaped projections formed longitudinally in a circular die hole having a 2.3 mm inner diameter. (Elongate pasta by this die structure had the same shape as that shown in FIG. 1A).

The total cross sectional area of the V-shaped grooves was 10% of the cross sectional area of the pasta strand without the grooves, and the depth of the grooves (corresponding to h of FIG. 1A) was 0.8 mm. The total length of the openings of the grooves in the cross section of the elongate pasta was 14.4% of the circumference of the pasta.

The fresh spaghetti made by this extruder was steamed in a steamer for 10 min., and then dried with hot air at 125° C., to obtain an instant spaghetti.

On the other hand, the same mixture as that described above was supplied to the extruder equipped with a die structure having an ordinary circular die hole (having 2.0 mm of diameter) for reference to the above, to make fresh spaghetti, the fresh spaghetti was then steamed, and dried, to obtain instant spaghetti.

When the instant spaghetti of the above both types were boiled, the spaghetti of the ivention became edible in 5 minutes, but the reference spaghetti required 11 minutes for making it edible. The appearance and texture of the spaghetti of the invention were not different from those of the reference spaghetti, and the presence of the slots could not be felt in case of eating them. Both spaghettis after boiling had the same diameter.

APPLICATION EXAMPLE

Fresh spaghetti of two types made by the same method as that in Example 2 (according to the invention and reference) were steamed in a steamer for 10 min., frozen at −20° C. for 10 hours, and then freeze-dried under the conditions of 40° C. of plate temperature and 0.4 Torr of vacuum.

When the freeze-dried spaghetti of the above two types were dipped in hot water for recovering them, the spaghetti of the invention became edible in 5 min., while the reference spaghetti required 10 min. for making it edible. The appearance and texture of the spaghetti of the invention were not different from those of the reference spaghetti, and the presence of the slots could be ignored in case of eating them. Both spaghettis after boiling had the same diameter.

EXAMPLE 3

70 parts of durum semolina, 30 parts of hard wheat flour, and 33 parts of water were mixed, and the mixture was supplied to an extruder, to obtain fresh spaghetti. The die structure mounted in the extrude has a projection of rectangular shape formed longitudinally in a circular die hole having 2.5 mm of inner diameter. (Elongate pasta made by this die structure had the same shape as that shown in FIG. 1B). The cross-sectional area of the rectangular groove was 2% of that of the pasta strand without the groove, and the depth of the groove (corresponding to h of FIG. 1B) was 0.9 mm. The length of the opening of the groove in the cross section of the elongate pasta was 1.4% of the circumference of the pasta.

On the other hand, the same mixture as that described above was supplied to the extruder equipped with a die structure having an ordinary circular die hole (having 2.0 mm of diameter) for reference to the above, for obtaining fresh spaghetti.

When the fresh spaghetti of the above two types were boiled, the spaghetti of the invention became edible in 3 minutes, but the reference spaghetti required 6 minutes for making it edible. The appearance and texture of the spaghetti of the invention were not different from those of the reference spaghetti, and the presence of the grooves could not be felt in case of eating them. Both spaghettis after boiling had the same diameter.

EXAMPLE 4

100 parts of semi-hard wheat flour, and 31% of 5% saline water were mixed, and the mixture was supplied to an extruder. The die structure mounted in the extruder has two U-shaped projections formed longitudinally in a rectangular die hole having a cross section of 3 mm×2 mm. (Elongate pasta formed by this die structure had the same shape as that shown in FIG. 1C). The cross-sectional area of the projection was 11.7% of that of the die hole having no projection, and the height of the projection (corresponding to the length of h of FIG. 1C, the groove of the noodle is formed by this projection) was 0.7 mm. The length of the opening of the groove in the cross-sectional area of the elongate pasta formed by this die hole was 10% of the circumference of the pasta.

The fresh elongate pasta (Japanese noodle or "Udon") formed by this extruder was dried to obtain dry elongate pasta.

On the other hand, the same mixture as that described above was supplied to the extruder equipped with a die structure having a die hole of ordinary rectangular shape (having 3 mm×2 mm) for reference to the above, for obtaining crude noodle. This crude noodle was moisture-regulated and dried, to obtain dry noodle for obtaining fresh elongate pasta in the same manner as above.

When the dry Japanese noodle of the above both types were boiled, the Japanese noodle of the invention became edible in 7 minutes, but the reference Japanese noodle required 14 minutes for making it edible. The appearance and texture of the elongate pasta of the invention were not different from those of the reference elongate pasta, and the presence of the slots could not be felt in case of eating them.

EXAMPLE 5

60 parts of durum semolina, 40 parts of hard wheat flour, and 33 parts of water were mixed, and the mixture was supplied to an extruder. The die structure mounted in the extruder has a wedge-shaped projection formed longitudinally in a die hole having 2.4 mm of inner diameter. (Elongate pasta formed by this die structure had the same shape as that shown in FIG. 1E.)

The cross-sectional area of the V-shaped groove in the elongate pasta was 25% of that of the elongate pasta without the groove, and the depth of the groove (corresponding to h of FIG. 1A) was 1.6 mm. The total length of the opening of the groove in the cross section of the elongate pasta was approx. 19.0% of the circumference of the pasta.

The fresh spaghetti formed by this extruder was steamed by a steamer for 10 min., and then dried by hot air at 125° C., to obtain an instant spaghetti.

On the other hand, the same mixture as that described above was supplied to the extruder equipped with a die structure having an ordinary circular die hole (having 2.0 mm of diameter) for reference to the above, for obtaining fresh spaghetti. Then, the fresh spaghetti was steamed, and dried, to obtain instant spaghetti in the same manner as described above.

When the instant spaghetti of the above both types were boiled, the spaghetti of the invention became edible in 5 minutes, but the reference spaghetti required 11 minutes for making it edible. The appearance and texture of the spaghetti of the invention were not different from those of the reference spaghetti, and the presence of the groove could not be felt in case of eating them. Both spaghettis after boiling had the same diameter.

The invention is not limited to the embodiments specifically described and is considered to encompass all of the modifications which may be carried out by one of ordinary skill within the scope of the claims.

We claim:

1. A die structure having a plurality of die holes through which dough is extruded to form elongated pasta strands, each of which has at least one groove extending longitudinally of the pasta strand, wherein the die structure comprises a main body provided with through-holes, each through-hole having therein a projection which projects from a root part located at the circumferential surface of the through-hole, radially inwardly of the through-hole and extending longitudinally of the through-hole, the projection located at the downstream end of the through-hole, relative to the dough flow directions, said projection having a cross-section corresponding to the cross-section of the groove in the elongated pasta strands to be formed, the upstream end of the projection, relative to the dough flow direction, having a tapered portion, the cross-section area of which decreases from the said cross-section to a reduced cross-section at said upstream end of the projection, a hollow open ended tubular insert having an inner surface of low coefficient of friction and provided with a cutout along the side of the insert, adjacent the downstream end of the through-hole, said cutout region shaped such that its periphery is snugly in contact with the root of the projection, exclusive of the end portion of the insert facing out the downstream end of the through-hole, so that the die hole is defined by the inner surface of the tubular insert and the side surfaces of the projection.

2. A die structure according to claim 1, wherein the main body is made of metal.

3. A die structure according to claim 1, wherein the projection has a V-shaped cross-section, the larger part of the V located at said root.

4. A die structure according to claim 1, the low coefficient of friction being between 0.2 and 0.4.

5. A die structure according to claim 1, the insert being formed of a hard fluorine resin.

6. A die structure according to claim 1, wherein the axial length of the tapered portion is the upstream 20% to 30% of the projection.

7. A die structure according to claim 1, wherein the tapered portion extends uniformly for the entire length of the projection from its upstream end to its downstream end.

* * * * *